United States Patent
Rogers, Jr. et al.

(10) Patent No.: US 10,534,931 B2
(45) Date of Patent: Jan. 14, 2020

(54) SYSTEMS, DEVICES AND METHODS FOR AUTOMATIC DETECTION AND MASKING OF PRIVATE DATA

(75) Inventors: Michael Allen Rogers, Jr., Federal Way, WA (US); Eric William Gilbertson, Everett, WA (US)

(73) Assignee: ATTACHMATE CORPORATION, Seattle, WA (US)

( * ) Notice: Subject to any disclaimer, the term of this patent is extended or adjusted under 35 U.S.C. 154(b) by 992 days.

(21) Appl. No.: 13/050,690

(22) Filed: Mar. 17, 2011

(65) Prior Publication Data
US 2012/0239540 A1    Sep. 20, 2012

(51) Int. Cl.
| | | |
|---|---|---|
| G06F 21/62 | (2013.01) |
| G06Q 40/00 | (2012.01) |
| H04W 12/12 | (2009.01) |
| G08B 13/196 | (2006.01) |
| G06F 17/21 | (2006.01) |
| H04L 29/06 | (2006.01) |

(52) U.S. Cl.
CPC .......... *G06F 21/6245* (2013.01); *G06F 17/21* (2013.01); *G06Q 40/00* (2013.01); *G08B 13/19686* (2013.01); *H04L 63/0428* (2013.01); *H04W 12/12* (2013.01); *G06Q 2220/10* (2013.01)

(58) Field of Classification Search
CPC .................................................. G06Q 40/60
See application file for complete search history.

(56) References Cited

U.S. PATENT DOCUMENTS

| | | | |
|---|---|---|---|
| 4,160,120 A | 7/1979 | Barnes et al. ................... 178/22 |
| 5,278,980 A | 1/1994 | Pedersen et al. ............. 395/600 |
| 5,388,148 A | 2/1995 | Seiderman ...................... 379/59 |
| 5,850,599 A | 12/1998 | Seiderman .................... 455/406 |
| 6,167,368 A | 12/2000 | Wacholder ........................ 704/9 |
| 6,820,237 B1 | 11/2004 | Abu-Hakima et al. ........ 715/531 |
| 6,941,285 B2 | 9/2005 | Sarcanin ......................... 705/67 |
| 7,007,025 B1* | 2/2006 | Nason ..................... G06F 21/82 |
| 7,017,804 B2 | 3/2006 | Guion ........................... 235/380 |

(Continued)

OTHER PUBLICATIONS

International Organization for Standardization and International Electrotechnical Commission, "Identification cards—Identification of issuers—Part 1: Numbering system," Third Edition, Oct. 15, 2006, 5 pages.

(Continued)

*Primary Examiner* — Jamie R Kucab
(74) *Attorney, Agent, or Firm* — Schwegman Lundberg & Woessner, P.A.

(57) ABSTRACT

Private, personal, secret, or otherwise sensitive data is masked or redacted in response to receiving an event signal indicative of an occurrence, if any, of at least one of a number of defined events associated with the set of data. The data to mask is detected by matching it to one or more defined patterns and then validating it, in the case of the data being a financial account or credit card account number, by using a validation process, such as the Luhn algorithm. Among others, the defined event may be a transmission of the data between a host computer system and a terminal emulator, an entry of the data into a host screen, or an export of a set of host screen data to an external application by an end user computer system.

26 Claims, 7 Drawing Sheets

(56) References Cited

U.S. PATENT DOCUMENTS

| | | | |
|---|---|---|---|
| 7,054,657 B2 | 5/2006 | Alanärä | 455/551 |
| 7,225,156 B2 | 5/2007 | Fisher et al. | 705/50 |
| 7,313,824 B1* | 12/2007 | Bala | G06F 21/10 |
| | | | 713/187 |
| 7,392,474 B2 | 6/2008 | Chen et al. | 715/254 |
| 7,568,616 B2 | 8/2009 | Zuili | 235/382 |
| 7,613,690 B2 | 11/2009 | Chowdhurry et al. | 707/3 |
| 7,617,532 B1 | 11/2009 | Alexander et al. | 726/22 |
| 7,630,986 B1 | 12/2009 | Herz et al. | 707/10 |
| 7,669,227 B2 | 2/2010 | Malcolm | |
| 7,673,799 B2 | 3/2010 | Hart et al. | 235/449 |
| 7,711,670 B2 | 5/2010 | Roediger | 706/46 |
| 7,770,789 B2 | 8/2010 | Oder, II et al. | 235/380 |
| 7,779,032 B1 | 8/2010 | Garfinkel | 707/776 |
| 7,784,685 B1 | 8/2010 | Hopkins, III | 235/380 |
| 7,849,010 B2 | 12/2010 | Deyoe et al. | 705/42 |
| 7,864,952 B2 | 1/2011 | Pauker et al. | 380/28 |
| 7,885,944 B1 | 2/2011 | Bruening | 707/694 |
| 2002/0007335 A1 | 1/2002 | Millard et al. | 705/37 |
| 2003/0004870 A1 | 1/2003 | Van Rensburg et al. | 705/39 |
| 2003/0020749 A1 | 1/2003 | Abu-Hakima et al. | 345/752 |
| 2003/0154075 A1 | 8/2003 | Schalk et al. | 704/231 |
| 2004/0054630 A1* | 3/2004 | Ginter et al. | 705/53 |
| 2004/0058705 A1 | 3/2004 | Morgan et al. | 455/556.1 |
| 2005/0039034 A1* | 2/2005 | Doyle | H04L 9/0825 |
| | | | 713/193 |
| 2005/0082376 A1 | 4/2005 | Lubow et al. | 235/494 |
| 2005/0119978 A1 | 6/2005 | Ates | 705/67 |
| 2005/0203855 A1 | 9/2005 | Malcolm | 705/64 |
| 2006/0004574 A1 | 1/2006 | Ju | 704/257 |
| 2006/0036596 A1 | 2/2006 | Zhang et al. | 707/5 |
| 2006/0129563 A1 | 6/2006 | Phillips et al. | 707/10 |
| 2006/0249574 A1 | 11/2006 | Brown et al. | 235/380 |
| 2007/0028297 A1 | 2/2007 | Troyansky et al. | 726/2 |
| 2007/0061356 A1 | 3/2007 | Zhang et al. | 707/102 |
| 2007/0136211 A1 | 6/2007 | Brown et al. | 705/75 |
| 2007/0169189 A1 | 7/2007 | Crespo et al. | 726/20 |
| 2007/0208671 A1 | 9/2007 | Brown et al. | 705/65 |
| 2007/0241183 A1 | 10/2007 | Brown et al. | 235/380 |
| 2007/0262138 A1 | 11/2007 | Somers et al. | 235/380 |
| 2007/0291995 A1 | 12/2007 | Rivera | 382/115 |
| 2007/0297624 A1 | 12/2007 | Gilman | 381/119 |
| 2008/0033880 A1 | 2/2008 | Fiebiger et al. | 705/44 |
| 2008/0130879 A1 | 6/2008 | Heinonen et al. | 380/44 |
| 2008/0170693 A1 | 7/2008 | Spies et al. | 380/277 |
| 2008/0170697 A1 | 7/2008 | Heinonen et al. | 380/277 |
| 2008/0183589 A1 | 7/2008 | Dixon et al. | 705/17 |
| 2008/0249994 A1 | 10/2008 | Passmore | 707/3 |
| 2008/0276098 A1 | 11/2008 | Florencio et al. | 713/183 |
| 2008/0276193 A1 | 11/2008 | Pettinati | 715/780 |
| 2008/0283592 A1 | 11/2008 | Oder, II ("J.D.") et al. | 235/380 |
| 2009/0125306 A1 | 5/2009 | Lejeune et al. | 704/236 |
| 2009/0235199 A1* | 9/2009 | Mastie | 715/781 |
| 2009/0249082 A1 | 10/2009 | Mattsson | 713/193 |
| 2009/0277968 A1 | 11/2009 | Walker | 235/494 |
| 2009/0294527 A1 | 12/2009 | Brabson et al. | 235/380 |
| 2009/0310778 A1 | 12/2009 | Mueller et al. | 380/44 |
| 2009/0317788 A1 | 12/2009 | Laine et al. | 435/2 |
| 2010/0009681 A1 | 1/2010 | Schneyer et al. | 455/435.1 |
| 2010/0027469 A1 | 2/2010 | Gurajala et al. | 370/328 |
| 2010/0041364 A1 | 2/2010 | Lott et al. | 455/404.1 |
| 2010/0049772 A1 | 2/2010 | Jing et al. | 707/776 |
| 2010/0063895 A1* | 3/2010 | Dominguez et al. | 705/26 |
| 2010/0068806 A1 | 3/2010 | Laine et al. | 435/366 |
| 2010/0077360 A1* | 3/2010 | Nason et al. | 715/856 |
| 2010/0089998 A1 | 4/2010 | Sandstrom et al. | 235/380 |
| 2010/0111297 A1 | 5/2010 | Pauker et al. | 380/37 |
| 2010/0179936 A1 | 7/2010 | Jeremiah | 706/50 |
| 2010/0185545 A1 | 7/2010 | Royyuru et al. | 705/67 |
| 2010/0228988 A1 | 9/2010 | Walker | 713/184 |
| 2010/0257612 A1 | 10/2010 | McGuire et al. | 726/26 |
| 2010/0280921 A1 | 11/2010 | Stone et al. | 705/27 |
| 2010/0299194 A1 | 11/2010 | Snyder et al. | 705/14.13 |
| 2010/0306854 A1 | 12/2010 | Neergaard | 726/26 |
| 2010/0318468 A1 | 12/2010 | Carr et al. | 705/79 |
| 2011/0016054 A1 | 1/2011 | Dixon et al. | 705/75 |
| 2011/0022521 A1 | 1/2011 | Collinge et al. | 705/67 |
| 2011/0157199 A1* | 6/2011 | Vitella-Espinoza | 345/541 |

OTHER PUBLICATIONS

International Organization for Standardization and International Electrotechnical Commission, "Identification cards—Identification of issuers—Part 2: Application and registration procedures," Third Edition, May 1, 2007, 6 pages.

Payment Card Industry Security Standards Council, "Data Security Standard—Requirements and Security Assessment Procedures," Version 2.0, Oct. 2010, pp. 1-75.

Wikipedia, "Luhn algorithm," URL = http://en.wikipedia.org/wiki/Luhn_algorithm, last modified Mar. 11, 2011, download date Mar. 18, 2011.

* cited by examiner

SYSTEMS, DEVICES AND METHODS FOR AUTOMATIC DETECTION AND MASKING OF PRIVATE DATA

BACKGROUND

Field

This disclosure generally relates to processing of private or sensitive data, and particularly to automatic detection of private or sensitive data within streams of data.

Description of the Related Art

The increasing amount of personal, private or otherwise sensitive data being stored or transferred electronically presents greater challenges to end users and organizations to prevent access to this data by unauthorized individuals or companies. For example, the PCI Security Standards Council Data Security Standard (PCI DSS) version 2.0, is a set of comprehensive requirements for enhancing payment account data security to help facilitate the broad adoption of consistent data security measures on a global basis. The PCI DSS is a multifaceted security standard that includes requirements for security management, policies, procedures, network architecture, software design and other critical protective measures. This comprehensive standard is intended to help organizations proactively protect customer account data.

Organizations and companies whose employees may have access to sensitive customer data, such as credit card numbers of their clients, customers, or employees, or access to other personal or financial account numbers, will have a vested interest in keeping this and other sensitive information protected and also complying with the PCI DSS.

BRIEF SUMMARY

A computer-implemented method may be summarized as including for each of a plurality of sets of data, in response to receiving an event signal indicative of an occurrence, if any, of at least one of a number of defined events associated with the set of data, determining by at least one processor whether the set of data that gave rise to the occurrence of the event to which the event signal corresponds includes a subset of data that matches at least one of a number of defined patterns; and for at least one of the plurality of sets of data that is determined to have at least one subset of data that matches at least one of the number of defined patterns, the at least one processor causing at least a portion of the at least one subset of data that matches the at least one of the number of defined patterns to be masked.

The number of defined events may include at least a transmission of the set of data between a host computer system and a terminal emulator executing on an end user computer system, an entry of the set of data into a host screen displayed by the end user computer system, and an export of a set of host screen data to an external application by the end user computer system.

The computer-implemented method may include, in response to determining that the subset of data matches at least one of the number of defined patterns, validating the subset of data by the at least one processor, wherein the at least one processor performs the causing at least a portion of the at least one subset of data that matches the at least one of the number of defined patterns to be masked only for the subset of data if the subset of data is validated.

The computer-implemented method may include alternatively producing an alert by the at least one processor for any subset of data that is not validated.

Validating may include determining whether the subset of data represents a valid account identifier of a financial account. Determining whether the subset of data represents a valid account identifier of a financial account may include executing a user configurable algorithm on the subset of data. The number of defined patterns may include a single pattern, the single pattern consisting of a number of digits representing an account identifier of a financial account. The number of defined patterns may include a first pattern of contiguous digits and a second pattern of digits and separator characters which separate some of the digits. The number of defined patterns may include a pattern of digits formed from a number of digits in each of at least two different fields of a data record. The number of defined patterns may include at least one user defined pattern of digits defined after distribution by a producer of a set of software executable by the at least one processor to perform the computer-implemented method.

The computer-implemented method may further include removing any separator characters of a defined set of extraneous separator characters from the set of data by the at least one processor before determining whether the set of data that gave rise to the occurrence of the event to which the event signal corresponds includes the subset of data that matches at least one of the number of defined patterns.

Causing at least a portion of the at least one subset of data that matches the at least one of the number of defined patterns to be masked may include causing at least a first portion of the subset of data to be masked while causing at least a second portion of the subset of data to be unmasked. The causing at least a first portion of the subset of data to be masked while causing at least a second portion of the subset of data to be unmasked may be based on a user configurable masking format.

The computer-implemented method may further include logging an identifier of a user identifier and an identifier of the subset of data by the at least one processor for any occurrence of access to the subset of data by a user identified by the user identifier.

The computer-implemented method may further include preventing any export of the subset of data to any other software application or any other device by the at least one processor for any subset of data that matches the at least one of the number of defined patterns.

The occurrence of the at least one of the number of defined events may be an end user indicating the set of data is to be entered as input.

A computer-implemented method may be summarized as including, for each of a plurality of sets of data, determining by at least one processor whether the set of data includes a subset of data that matches at least one of a number of defined patterns; and for at least one of the plurality of sets of data that is determined to have at least one subset of data that matches at least one of the number of defined patterns, storing the subset of data to a protected data buffer by the at least one processor, the protected buffer separate from an unprotected data buffer to which other data in the set of data which does not match at least one of the number of defined patterns are stored.

The computer-implemented method may further include storing the other data in the set of data which does not match at least one of the number of defined patterns to a live data buffer that an emulator executing on an end user computer system maintains with a host computer system in background by the at least one processor.

The computer-implemented method may further include receiving by the at least one processor an event signal indicative of an occurrence of at least one of a number of defined events associated with a respective set of data that gave rise to the occurrence of the event, wherein the determining whether the set of data includes a subset of data that matches at least one of a number of defined patterns is performed in response to the receiving of the event signal indicative of the occurrence of the at least one of the number of defined events associated with the respective set of data, and the number of defined events includes at least a transmission of the set of data between a host computer system and a terminal emulator executing on an end user computer system, an entry of the set of data into a host screen displayed by the end user computer system, and an export of a set of host screen data to an external application by the end user computer system.

The computer-implemented method may further include, in response to determining that the subset of data matches at least one of the number of defined patterns, validating the subset of data by the at least one processor, wherein the at least one processor performs the causing at least a portion of the at least one subset of data that matches the at least one of the number of defined patterns to be masked only for the subset of data if the subset of data is validated.

The computer-implemented method may further include alternatively producing an alert by the at least one processor for any subset of data that is not validated.

Validating may include determining whether the subset of data represents a valid account identifier of a financial account.

Determining whether the subset of data represents a valid account identifier of a financial account may include executing a user configurable algorithm on the subset of data. The number of defined patterns may include a single pattern, the single pattern consisting of a number of digits representing an account identifier of a financial account. The number of defined patterns may include a first pattern of contiguous digits and a second pattern of digits and separator characters which separate some of the digits. The number of defined patterns may include a pattern of digits formed from a number of digits in each of at least two different fields of a data record. The number of defined patterns may include at least one user defined pattern of digits defined after distribution by a producer of a set of software that is executable by the at least one processor to perform the computer-implemented method.

The computer-implemented method may further include removing any separator characters of a defined set of extraneous separator characters from the set of data by the at least one processor before determining whether the set of data includes the subset of data that matches at least one of the number of defined patterns.

Causing at least a portion of the at least one subset of data that matches the at least one of the number of defined patterns to be masked may include causing at least a first portion of the subset of data to be masked while causing at least a second portion of the subset of data to be unmasked. Causing at least a first portion of the subset of data to be masked while causing at least a second portion of the subset of data to be unmasked may be based on a user configurable masking format.

The computer-implemented method may further include logging an identifier of a user identifier and an identifier of the subset of data by the at least one processor for any occurrence of access to the subset of data by a user identified by the user identifier.

The computer-implemented method may further include preventing any export of the subset of data to any other software application or any other device by the at least one processor for any subset of data that matches the at least one of the number of defined patterns.

A computer-implemented method may be summarized as including receiving a data stream; detecting, by at least one processor, patterns of characters within the received data stream; selecting, by the at least one processor, a set of characters within the received data stream based on the detected patterns; determining, by the at least one processor, validity of the selected set of characters according to a result of a function that evaluates a relationship between at least one character of the selected set of characters and a plurality of other characters of the selected set of characters; and determining, by the at least one processor, whether to mask at least a portion of the selected set of characters within the received data stream based on the determined validity.

The patterns detected may be based on one of a number of defined patterns. The receiving the data stream may be in response to receiving an event signal indicative of an occurrence, if any, of at least one of a number of defined events associated with the data stream.

The computer-implemented method may further include storing data containing the selected set of characters to a protected data buffer by the at least one processor, the protected buffer separate from an unprotected data buffer to which other data containing other unselected sets of characters in the data stream are stored.

A system may be summarized as including a computer processor; and a non-transitory memory communicatively coupled to the computer processor having computer-executable instructions stored thereon that when executed by the computer processor cause the computer processor to perform: for each of a plurality of sets of data, in response to receiving an event signal indicative of an occurrence, if any, of at least one of a number of defined events associated with the set of data, determining whether the set of data that gave rise to the occurrence of the event to which the event signal corresponds includes a subset of data that matches at least one of a number of defined patterns; and for at least one of the plurality of sets of data that is determined to have at least one subset of data that matches at least one of the number of defined patterns, causing at least a portion of the at least one subset of data that matches the at least one of the number of defined patterns to be masked.

The number of defined events may include at least a transmission of the set of data between a host computer system and a terminal emulator executing on an end user computer system, an entry of the set of data into a host screen displayed by the end user computer system, and an export of a set of host screen data to an external application by the end user computer system.

The computer-executable instructions, when executed by the computer processor, may further cause the computer processor to perform: in response to determining that the subset of data matches at least one of the number of defined patterns, validating the subset of data by the at least one processor, wherein the causing at least a portion of the at least one subset of data that matches the at least one of the number of defined patterns to be masked is performed only for the subset of data if the subset of data is validated. The computer-executable instructions, when executed by the computer processor, may further cause the computer processor to perform: alternatively producing an alert for any subset of data that is not validated. The validating may include determining whether the subset of data represents a valid account identifier of a financial account.

At least one non-transitory computer-readable medium may be summarized as a non-transitory computer-readable medium that stores instructions that when executed by at least one computer system cause the at least one computer system to perform: for each of a plurality of sets of data, in response to receiving an event signal indicative of an occurrence, if any, of at least one of a number of defined events associated with the set of data, determining whether the set of data that gave rise to the occurrence of the event to which the event signal corresponds includes a subset of data that matches at least one of a number of defined patterns; and for at least one of the plurality of sets of data that is determined to have at least one subset of data that matches at least one of the number of defined patterns, causing at least a portion of the at least one subset of data that matches the at least one of the number of defined patterns to be masked.

The number of defined events may include at least a transmission of the set of data between a host computer system and a terminal emulator executing on an end user computer system, an entry of the set of data into a host screen displayed by the end user computer system, and an export of a set of host screen data to an external application by the end user computer system. The instructions, when executed by the at least one computer system, may further cause at least one computer system to perform: in response to determining that the subset of data matches at least one of the number of defined patterns, validating the subset of data by the at least one processor, wherein the causing at least a portion of the at least one subset of data that matches the at least one of the number of defined patterns to be masked is performed only for the subset of data if the subset of data is validated. The instructions, when executed by the at least one computer system, may further cause at least one computer system to perform: alternatively producing an alert for any subset of data that is not validated. The validating may include determining whether the subset of data represents a valid account identifier of a financial account.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
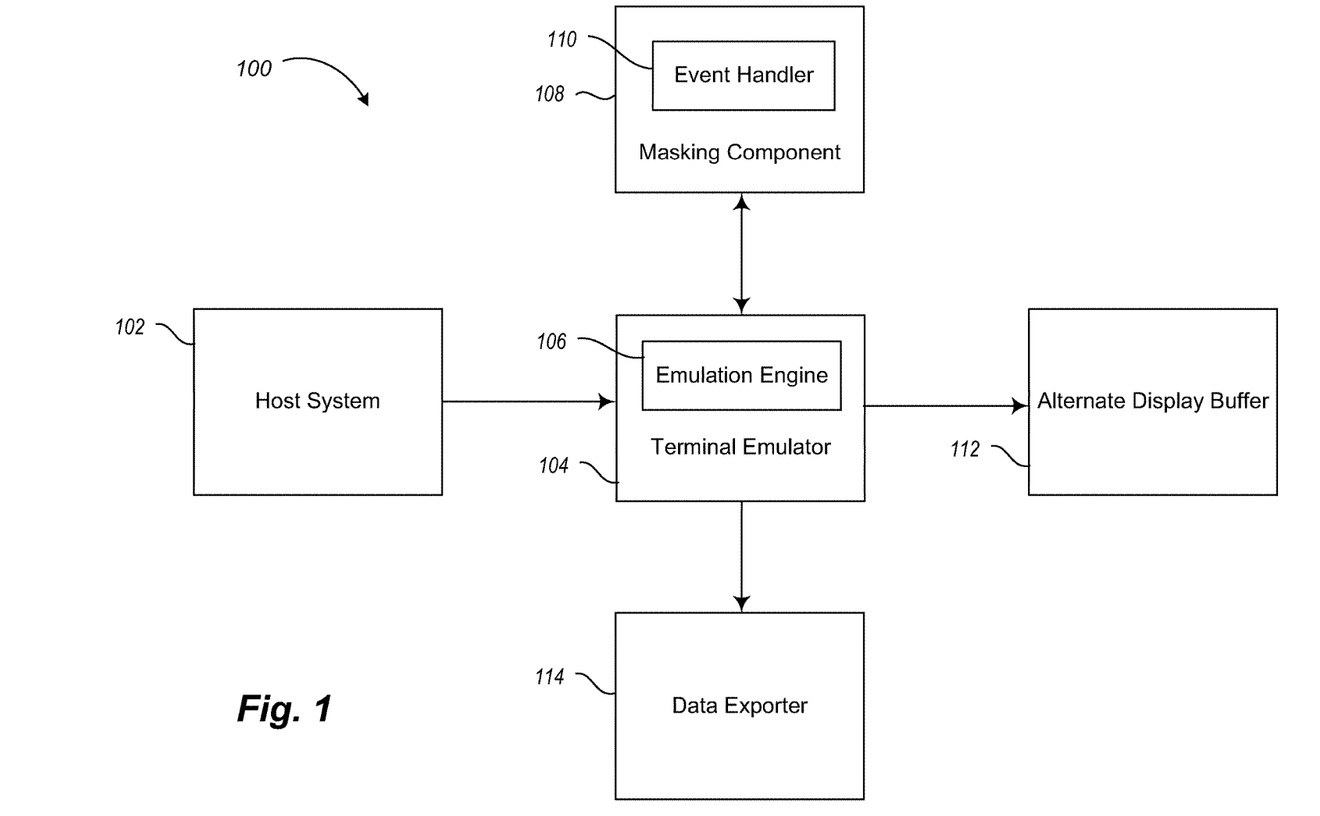
FIG. 1 is a schematic diagram of a system for automatic detection and masking of private data, according to one illustrated embodiment.

FIG. 1 shows a system 100 for automatic detection and masking of private data, according to one illustrated embodiment.

A host computer system 102 is in operable communication with a terminal emulator 104. The terminal emulator 104 may be running locally on the host system 102, which may also be a virtual machine, or connected to the host system 102 over a network, or be implemented within a networked environment.

A terminal emulator (also referred to as a terminal application) is a program that emulates a computer video terminal, which is an electronic or electromechanical hardware device that is used for entering data into, and displaying data from, a computer or a computing system. The function of a terminal is generally confined to the display and input of data. Specific functionality, including graphical user interface (GUI) capabilities may also be provided. A terminal device with significant local programmable data processing capability may be referred to as a "smart terminal" or "fat client." A terminal that depends on the host computer system for its processing power may be referred to a "thin client." Terminal emulator 104 may emulate one, both or any combination of these different types of terminals. Also, the computer system or virtual machine on which the terminal emulator 104 is running, whether it is the host computer system 102, another computer system, or another virtual machine, may allow concurrent use of local programs and access to other remote systems by that computer system or virtual machine.

The terminal emulator 104 may be configured to receive data input from a user or in an automated fashion from another program or application. The terminal emulator 104 may then display, export or output this data in any manner and also communicate to the host system 102 the data input. The terminal emulator 104 may also be configured to receive data from the host system 102 in order to display, export or output it in any manner. The terminal emulator 104 includes a terminal emulation engine 106 which is configured to handle the communication and processing of data received by and sent from the terminal emulator 104 and controls what is displayed or otherwise output from the terminal emulator 104.

Also, shown is an alternate display buffer 112, a masking component 108, and a data exporter 114, which are all in operable communication with the terminal emulator 104, and particularly the emulation engine 106. One or more of the alternate display buffer 112, the masking component 108, and the data exporter 114 may be computer programs or applications running or executing locally on a processor of the same computer system as that of the terminal emulator, or may in some embodiments be part of the terminal emulator 104. Also, one or more of the alternate display buffer 112, the masking component 108, and the data exporter 114 may be running or executing on a processor of remote computer systems connected to the terminal emulator over a network or be running on one or more virtual machines separate from each other or the terminal emulator 104. Such a network may be any computer network, telecommunications network, or combination of telecommunications and computer networks that enables communication between the various components shown in FIG. 1.

The masking component is configured to detect and mask particular data received by and sent from the terminal emulator 104. This data received by and sent from the terminal emulator 104, or portions of such data, may be referred to as a "stream of data" or "data stream." Particular events trigger the event handler 110 of the masking component 108 to perform the detection and masking operations on the data stream and communicate such masked data back to the terminal emulation engine 106 of the terminal emulator 104 as will be discussed in further detail below.

The alternate display buffer 112 is configured to store the masked data to be displayed, output, or otherwise exported by the terminal emulator 104. This masked data, for example, is that which matched a predefined pattern causing it to be masked by the masking component 108, and was previously communicated from the masking component 108 to the terminal emulator 104. This masked data is to be displayed by the terminal emulator instead of the unmasked data which would otherwise normally be displayed. The alternate display buffer 112 may be a protected data buffer which is separate from an unprotected data buffer of the terminal emulator 104 to which other unmasked data or other data which does not match the defined pattern is stored. This other unmasked data or other data which does not match the defined pattern may be stored to a live data buffer that the terminal emulator 104 maintains with the host system 102 in background.

The data exporter 114 is configured to export the data stream to other programs, applications or systems for further processing. The data exporter 114 may be configured to export masked data which was previously communicated from the masking component 108 to the terminal emulator 104 instead of exporting the unmasked data which would otherwise normally be exported.

Although the physical environment of the system 100 may have connected devices such as computers, the physical environment may alternatively have or be described as comprising various processor-based digital devices such as personal digital assistants (PDAs), televisions, MP3 players, etc., software objects such as interfaces, Component Object Model (COM) objects and the like.

There are a variety of systems, components, and network configurations that may also support distributed computing environments within the system 100. For example, computing systems may be connected together within the system 100 by wired or wireless systems, by local networks or by widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of the system 100.

Figure 2:
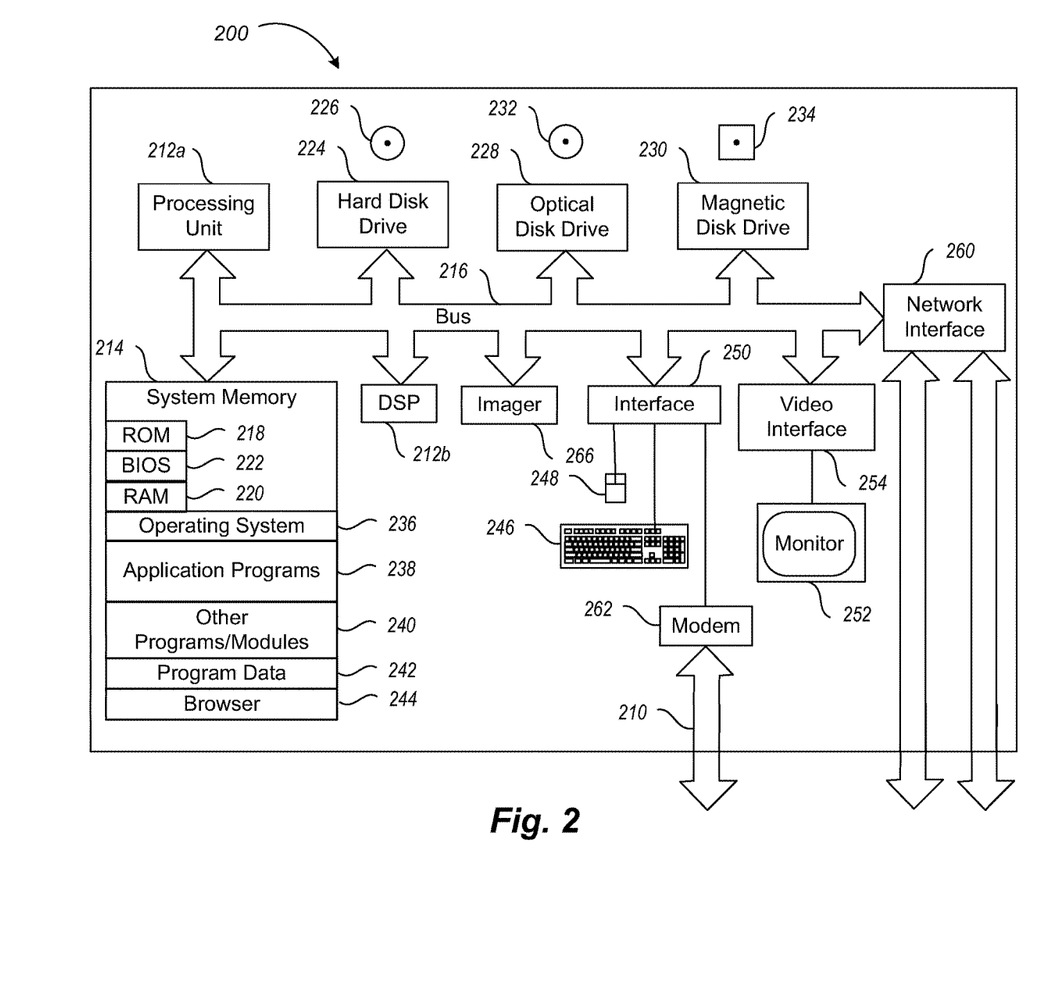
FIG. 2 is a schematic diagram of an example computer system on which some or all the components of the system for automatic detection and masking of private data of FIG. 1 may be implemented, and which is suitable for implementing systems, devices and methods for automatic detection and masking of private data, according to one illustrated embodiment.

FIG. 2 is a schematic diagram of an example computer system 200 on which some or all the components of the system 100 for automatic detection and masking of private data of FIG. 1 may be implemented, and which is suitable for implementing systems, devices and methods for automatic detection and masking of private data, according to one illustrated embodiment.

Although not required, the embodiments will be described in the general context of computer-executable instructions, such as program application modules, objects, or macros stored on computer- or processor-readable storage media and executed by a computer or processor, e.g., such as that of computer system 200. Those skilled in the relevant art will appreciate that the illustrated embodiments as well as other embodiments can be practiced with other system configurations and/or other computing system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The computer system 200 is suitable for implementing systems, devices and methods for automatic detection and masking of private data, according to one illustrated embodiment. The computer system 200 will at times be referred to in the singular herein, but this is not intended to limit the embodiments to a single device since in typical embodiments, there may be more than one computer system or devices involved. Unless described otherwise, the construction and operation of the various blocks shown in FIG. 2 are of conventional design. As a result, such blocks need not be described in further detail herein, as they will be understood by those skilled in the relevant art.

The computer system 200 may include one or more processing units 212a, 212b (collectively 212), a system memory 214 and a system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and a local bus. The system memory 214 includes read-only memory ("ROM") 218 and random access memory ("RAM") 220. A basic input/output system ("BIOS") 222, which can form part of the ROM 218, contains basic routines that help transfer information between elements within the computer system 200, such as during start-up.

The computer system 200 may also include a plurality of interfaces such as network interface 260, interface 250 supporting modem 262 or any other wireless/wired interfaces.

The computer system 200 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable storage media 226, 232, 234, may provide nonvolatile and non-transitory storage of computer readable instructions, data structures, program modules and other data for the computer system 200. Although the depicted computer system 200 is illustrated employing a hard disk 224, optical disk 228 and magnetic disk 230, those skilled in the relevant art will appreciate that other types of computer-readable storage media that can store data accessible by a computer may be employed, such as magnetic cassettes, flash memory, digital video disks ("DVD"), Bernoulli cartridges, RAMs, ROMs, thumb drives, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 212a.

Program modules can be stored in the system memory 214, such as an operating system 236, one or more application programs 238, other programs or modules 240 and program data 242. Application programs 238 may include instructions that cause the processor(s) 212 to provide automatic detection and masking of private data as described herein and communication and storage of masked data and unmasked data, such as, for example, by providing the terminal emulator 104, the alternate display buffer 112, the masking component 108, and the data exporter 114 shown in FIG. 1. Other program modules 240 may include instructions for handling host system operations and/or other terminal emulation and data I/O procedures and routines. The system memory 214 may also include communications programs, for example, a Web client or browser 244 for permitting the computer system 200 to access and exchange data with sources such as Web sites of the Internet, corporate intranets, extranets, or other networks and devices as described herein, as well as other server applications on server computing systems and host systems. The browser 244 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft of Redmond, Wash. The automatic detection and masking of private data described herein may be applied to various data streams including data input to, received by and sent from the browser 244.

While shown in FIG. 2 as being stored in the system memory 214, the operating system 236, application programs 238, other programs/modules 240, program data 242 and browser 244 can be stored on the hard disk 226 of the hard disk drive 224, the optical disk 232 of the optical disk drive 228 and/or the magnetic disk 234 of the magnetic disk drive 230.

An operator can enter commands and information into the computer system 200 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The computer system 200 can include other output devices, such as speakers, printers, etc.

The computer system 200 can operate in a networked environment using logical connections to one or more remote computers and/or devices as described above with reference to FIG. 1. For example, the computer system 200 can operate in a networked environment using logical connections to one or other computing systems, mobile devices, and other service providers or information servers. Communications may be via a wired and/or wireless network architecture, for instance wired and wireless enterprise-wide computer networks, intranets, extranets, telecommunications networks, and mobile networks.

Figure 3:
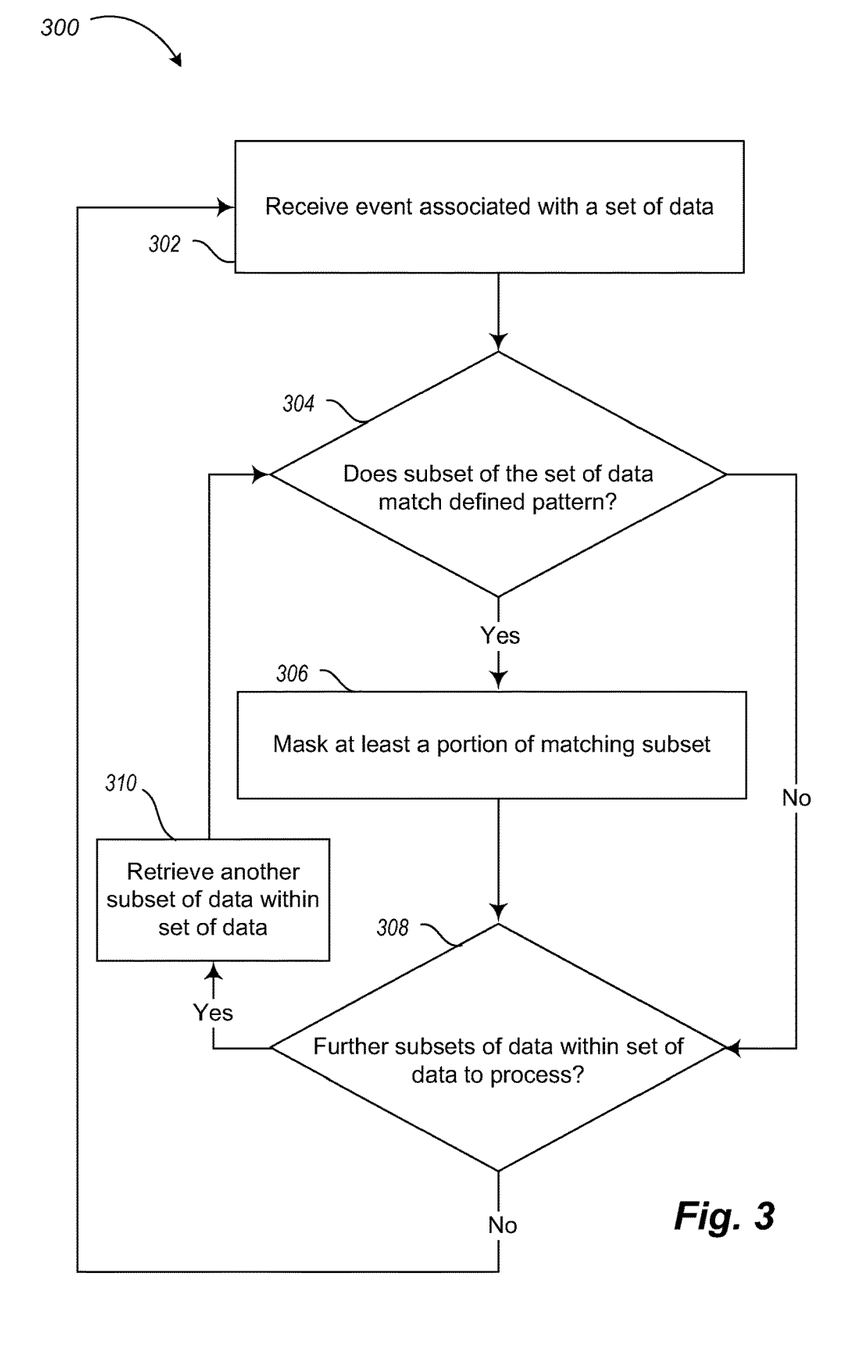
FIG. 3 is a flow diagram showing a method of automatic detection and masking of private data, according to one illustrated embodiment.

FIG. 3 shows a flow diagram of a method 300 of automatic detection and masking of private data, according to one illustrated embodiment. For example, in one embodiment, the components of FIG. 1 may perform or control performance of the method illustrated in FIG. 3.

At 302, a device or processor thereof receives an event which is associated with a set of data. For example, this event may be any one of a number of defined events associated with the set of data. Such events may include, but are not limited to: a host system sending updated screen information or data (e.g., to a terminal, terminal emulator or display); a user indicating a set of data is to be entered as input (e.g., by pressing an enter key, clicking a mouse button, activating a selectable item or icon on a GUI or navigating away from an input field in a terminal, terminal emulator or GUI); an attempt to export or otherwise send data from a host system, terminal, terminal emulator, or GUI; an attempt to import or otherwise receive data by a host system, terminal, terminal emulator, or GUI; etc. For example, when a user initiates a data transfer between a terminal emulator (e.g., the terminal emulator 104 of FIG. 1) and an external component via some application gesture or action, and before the data transfer is completed, the terminal emulator may automatically raise an event which may be accompanied by the set of data to be transferred. This event may be received, for example, by the event handler 110 of the masking component 108 of FIG. 1.

At 304, a processor determines whether the associated set of data or a subset of the set of data matches a defined pattern. In one embodiment, the performance of this determination may be triggered by the event received. The defined patterns may be, for example, those associated with data that is intended to be kept private or other data of interest. Such data may include, but is not limited to: account numbers including credit card, debit card, gift card, insurance, investment, brokerage, savings, checking, retirement or other financial or personal account numbers, etc.; personal information such as telephone numbers, email addresses, home addresses, and medical data, etc.; identification data or numbers such as user names, network addresses, passwords, authentication credentials, social security numbers, driver's license numbers, personal identification numbers (PINs), etc.; or any other piece of data one may want to keep private or be masked, etc.

In one embodiment, a processor may match patterns using regular expressions to match strings of text corresponding to credit card account numbers or other data as described above. For example, credit cards numbers may match regular expressions that indicate a string of contiguous numbers of a particular length (e.g., 16 digits), or groups of numbers of a particular length, which credit card account numbers are known to have. As one example, credit card numbers are often typically have 13 to 16 digits. Also, credit card numbers issued by particular credit card issuers or banks may have a particular group of numbers having a specific value in a specific location within the credit card account number. Thus, a regular expression may be used to identify credit card numbers issued by particular credit card companies or banks as well.

Matching algorithms may include other regular expressions and may be utilized to detect other types of account numbers known to follow a particular pattern. Also, matching algorithms may include matching rules or exceptions based on other criteria including, but not limited to: which area of the interface or screen the data is displayed or is to be displayed; tags or metadata associated with the data displayed or to be displayed, etc.; classification level of the data; where or in which portion of memory the data is stored, was stored or is to be stored; an identified user or permissions of an identified user that has or may have access to the data, etc. Also, an identifier of a user and an identifier of the set of data, or a subset of the set of data, may be logged for any occurrence of access to the subset of data by a user identified by the user identifier.

These matching algorithms may be previously stored within a particular user system or as part of the terminal emulator, terminal emulator plug-in or other interface system or interface plug-in such that a user need not specify the algorithm, regular expression or specific pattern in order for the matching to be performed. In other embodiments, the terminal emulator, terminal emulator plug-in or other interface system or interface plug-in may provide a selection of various types of information, account numbers, etc. to be masked, and in response to the user selection, automatically use the appropriate defined pattern or matching algorithm corresponding to the types of information, account numbers, etc. selected to be masked. Also, further events may be automatically triggered once a match or near match is found, alerting other components of the system, users or remote systems.

At 306, if it is determined that at least a portion of the set of data or a subset of the set of data matches the defined pattern, then the system or processor masks the portion of the matching set or subset of data (e.g., by the masking component 108 shown in FIG. 1). Alternatively, it may be required that a portion of a particular size or the entire set of data or entire subset of data match the defined pattern.

In some embodiments, the entire matching portion may be masked, or a portion of the matching portion may be masked. In yet other embodiments, portions of data surrounding the matching portion may instead or also be masked. For example, the masking may include replacing one or more characters of the matching portion with other characters to mask or redact the matching portion to make it difficult or impossible by viewing or reading the masked data for one to determine the values of the corresponding original unmasked data. Also, all or part of the matching portion may instead be scrambled. These optional masking formats above may be user configurable and provided to the user by the system or processor thereof as different selectable options. In other alternative embodiments, the system may perform other functions instead of or in addition to the masking or scrambling, such as highlighting the matching data or alerting other components, the user, or other systems that a match was detected.

The system or processor thereof may keep or store a first unmasked set of data while creating a second set of masked data to be merged with the rest of the data stream immediately or during subsequent processing, displaying, exporting, storing or other communication of the data stream from which the set or subset of data was originally obtained or received. Alternatively, the system or processor thereof may use the masked data to completely replace the corresponding unmasked portions and entirely delete the corresponding unmasked portion of the original data. If it is not determined that at least a portion of the set of data or a subset of the set of data matches the defined pattern, then the process continues to 308 without performing any masking.

At 308, the system or processor thereof determines whether further subsets of data within the set of data are available to process. For example, the data stream may include a set of updated screen information sent by a host system to a terminal emulator. The system or processor thereof may then determine whether there is still additional unprocessed data within the updated screen information sent to the terminal emulator. For example, in the detection of credit card account numbers, after removing non-numeric data from the stream, the system or processor thereof may advance a read cursor one digit in the stream and check 15 digits ahead, looking each time for a match to a defined pattern associated with credit card numbers. Once there are not at least 15 more characters in the stream in addition to the current character, the system or processor thereof may determine that further subsets of data within the set of data are not available to process.

Other sets of data which may be processed include, but are not limited to: a set of data entered or to be entered as input; a set of data exported, to be exported, or otherwise sent from a host system, terminal, terminal emulator, GUI or other interface; a set of data imported, to be imported, or otherwise received by a host system, terminal, terminal emulator, GUI or other interface; a set of data stored in a file; a set of data stored in a protected or unprotected buffer or other memory that is to be sent or received by a computing system, etc. If it is determined that further subsets of data within the set of data are available to process, then the method 300 continues to 310.

At 310, the system or processor thereof retrieves another subset of data from the set of data and the method 300 continues to operate on that subset of data starting at 304. For example, in the detection of credit card account numbers, after non-numeric data has been removed from the stream, the system or processor thereof may advance a read cursor one digit in the stream and the current digit and the next 15 digits ahead are retrieved for processing. However, this range of digits to read ahead may vary. For example, many credit card numbers are typically known to have anywhere from 13 to 16 digits and the amount of digits to read ahead may be 15 digits as described above when looking for credit card number patterns of 16 digits in length (i.e., reading the current and next 15 digits). As another example, the amount of digits to read ahead may be 14 digits when looking for credit card number patterns of 15 digits in length (i.e., reading the current and next 14 digits).

If further subsets of data within the set of data are not available to process, the method 300 continues to 302, where another event may be received associated with another set of data to be processed.

Figure 4:
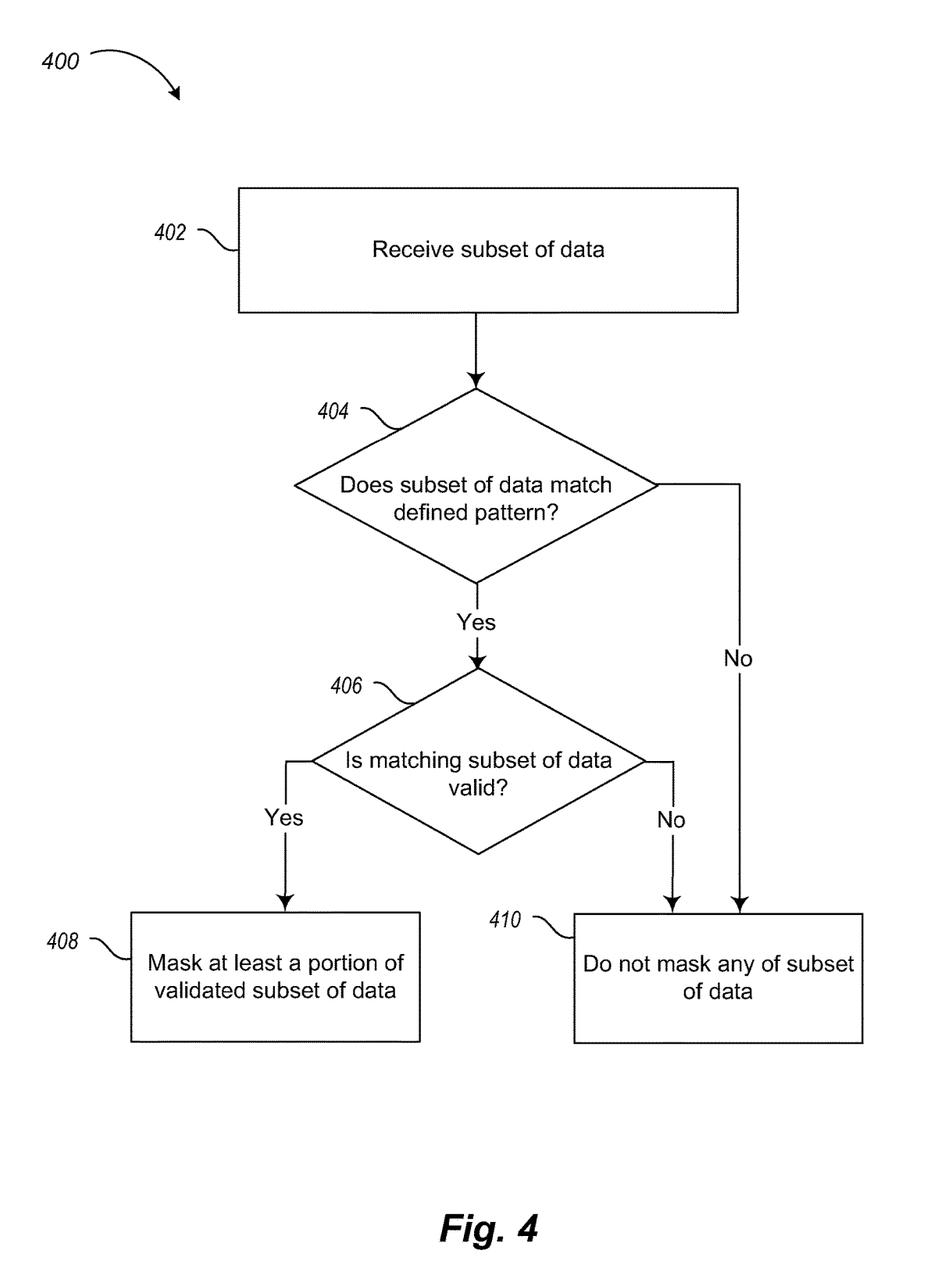
FIG. 4 is a flow diagram showing a method of automatic detection and masking of private data, including validation of detected data, according to one illustrated embodiment.

FIG. 4 is a flow diagram showing a method 400 of automatic detection and masking of private data, including validation of detected data, according to one illustrated embodiment.

At 402, the system or processor thereof receives a subset of data. For example, this may be a subset of data within the set of data associated with the received event described above with reference to FIG. 3.

At 404, the system or processor thereof determines whether the subset of data matches a defined pattern. For example, the defined pattern may be that described above with reference to FIG. 3. If it is determined that the subset of data matches the defined pattern, the method 400 continues to 406. If it is determined that the subset of data does not match the defined pattern, the method 400 continues to 410, where no masking is performed on any of the subset of data. However, masking or other operations may possibly be performed on the subset of data in other different detection processes or masking routines.

At 406, the system or processor thereof determines whether the matching subset of data is valid (e.g., whether subset of data represents a valid account identifier of a financial account). This determination may be based on one or many validation processes embedded or stored in the system, or selected or input by a user. The computer-implemented validation process takes the matching subset of data (e.g., a matching string of text) as input and applies a validation process or test to the input that may analyze the particular values and positions of data within the input relative to other data in the input or other external data. The validation process may then provide as output an indication of whether the input passed the validation process. The validation process may provide further indication of whether the matching data is actually particular data of interest to be masked. Many account numbers are generated using specific rules or mathematical formulas that may be utilized by the validation process to validate whether matching patterns of data may be actual account numbers, or coincidentally match a particular defined pattern.

For example, a computer-implemented version of the Luhn validation algorithm may be used to electronically and automatically validate whether a matching subset is an issued credit card number and also may be used to validate other types of account numbers in many circumstances. For example, the Luhn algorithm or Luhn formula, also known as the "modulus 10" or "mod 10" algorithm, is a checksum formula used to validate a variety of identification numbers, including, but not limited to credit card numbers, International Mobile Equipment Identity (IMEI) numbers, and National Provider Identifier numbers in U.S. and Canadian social insurance or social security numbers. For example, the Luhn algorithm includes a function that evaluates the relationship between at least one character in the string of numbers input to the algorithm and a plurality of other characters of the string of numbers input to the algorithm. The Luhn algorithm is specified in the International Organization for Standardization (ISO)/IEC 7812 standard published by the ISO, which is hereby incorporated by reference in its entirety. However, other validation processes such as others using various other checksums, hash routines and cryptographic keys or algorithms may also be utilized.

At 408, if it had been determined the matching subset of data is valid then the system or processor thereof masks the portion of the matching set or subset of data (e.g., by the masking component 108 shown in FIG. 1) or takes other actions as described above in reference to FIG. 3. In some embodiments, the system or processor thereof may mask the entire matching portion, or may mask only a portion of the matching portion.

At 410, if it had been determined the matching subset of data is not valid, then no masking is performed on any of the subset of data. However, as stated above, masking or other operations may possibly be performed on the subset of data in other different detection processes or masking routines. For example, the system or processor thereof may produce an alert for any subset of data that is not validated, or for any subset that is determined not valid.

Figure 5:
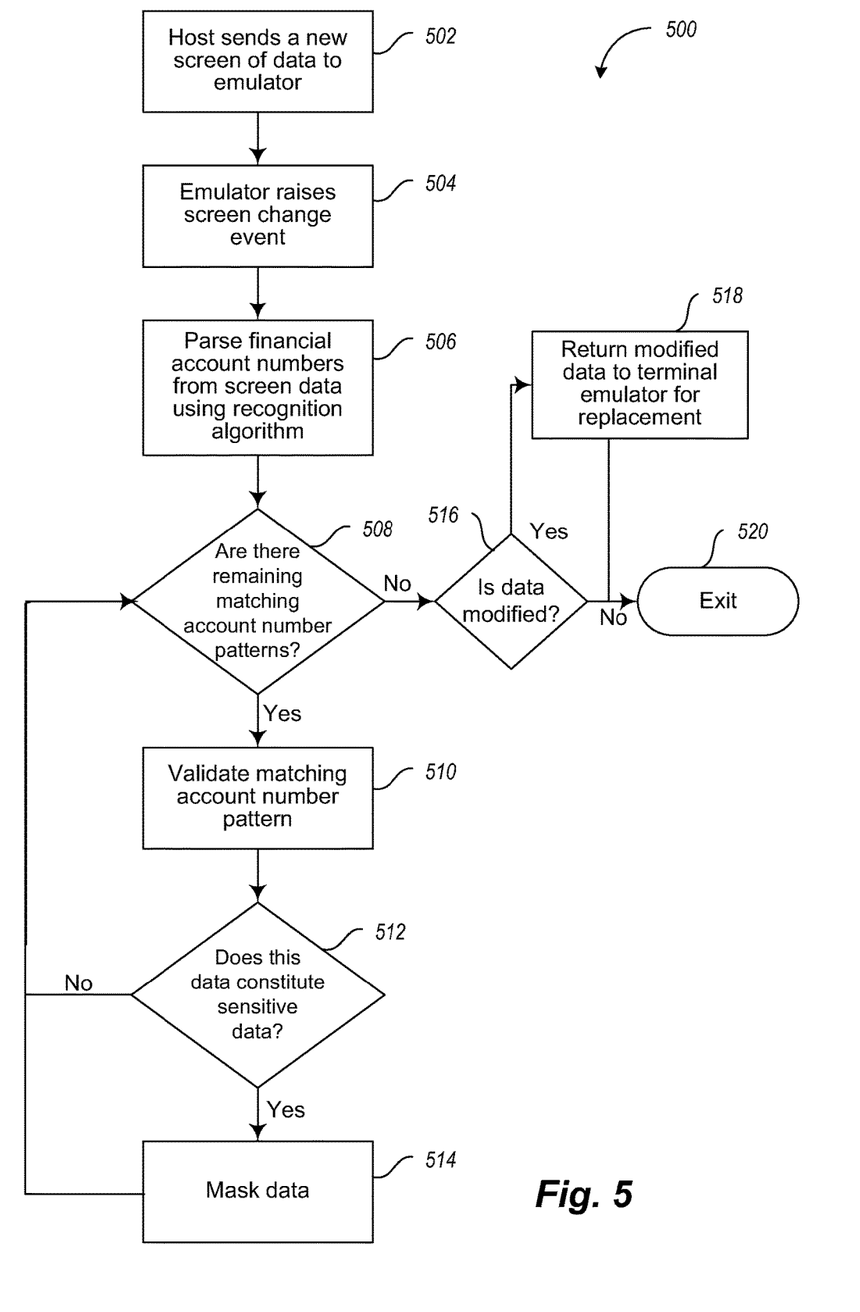
FIG. 5 is a flow diagram showing a method of automatic detection and masking of financial account number data sent to a terminal emulator, according to one illustrated embodiment.

FIG. 5 is a flow diagram showing a method 500 of automatic detection and masking of financial account number data sent to a terminal emulator, according to one illustrated embodiment.

At 502, the host sends a new screen of data to the emulator. For example, referring again to FIG. 1, the host system 102 may send a new screen of data to the terminal emulator 104.

At 504, the emulator raises a screen change event. For example, this screen change event may be received by the event handler 110 of the masking component 108 of FIG. 1.

At 506, financial account numbers (e.g., credit card account numbers) are automatically parsed from the screen data using a computer-implemented recognition algorithm. The parsing may include removing any separator characters of a defined set of extraneous separator characters from the screen data. The computer-implemented recognition algorithm may include using one or more defined patterns to find matching strings of data within the screen data. These defined patterns may include, but are not limited to, one or more of: a single pattern, the single pattern consisting of a number of digits representing an account identifier of a financial account; a first pattern of contiguous digits and a second pattern of digits and separator characters which separate some of the digits; a pattern of digits formed from a number of digits in each of at least two different fields of a data record; or at least one user defined pattern of digits defined after distribution by a producer of a set of software.

At 508, the system or processor thereof determines whether there are any matching account number patterns in the screen data resulting from the parsing performed at 506 that have yet to be validated. If there are no remaining (or were never any) matching account number patterns within the screen data, then the method 500 continues to 516.

At 510, if it was determined that there are matching account number patterns within the screen data yet to be validated, then the system or processor thereof retrieves the next matching account number pattern yet to be validated for validation and validates such in order to determine whether the matching account number pattern is likely an actual account number (e.g., a real credit card account number) and thus constitutes sensitive or private data. This validation may utilize a computer-implemented Luhn algorithm or other algorithm as described above.

At 512, the system or processor thereof determines whether the matching account number pattern within the screen data is sensitive or private data based on the result of the validation. If the matching account number pattern was determined to be a valid account number, then the system or processor thereof designates the matching account number pattern within the screen data as sensitive or private data. If the matching account number pattern was not determined to be a valid account number, then the matching account number pattern within the screen data is not designated as sensitive or private data. If it was determined that the matching account number pattern within the screen data is not sensitive or private data, then the method 500 continues to 508 and thus repeats until there are no remaining matching account number patterns within the screen data yet to be validated.

At 512, if it was determined that the matching account number pattern within the screen data is sensitive or private data, then the system or processor thereof masks the matching account number pattern and replaces the matching account number pattern by the masked data. This masked data may be stored in an alternate display buffer as described above, for example. The method 500 then continues to 508. Thus, the method 500 repeats until there are no remaining matching account number patterns within the screen data yet to be validated.

At 516, the system or processor thereof determines whether any of the screen data was modified (e.g., masked).

At 518, if it was determined that the screen data was modified, the system or processor thereof returns this modified data to the terminal emulator to replace the original data to be displayed by the terminal emulator and may also store such in an alternate display buffer as described above.

At 520, if it was not determined that the screen data was modified, then the method 500 exits without replacing the original data to be displayed by the terminal emulator.

The same process 500 or a similar process as described above may also be applied to sets of data other than the new screens of data sent by the host system to the terminal emulator. For example, events may also be raised which are triggered by entry (e.g., by typing or cutting and pasting) of a set of data into a host screen displayed by the end user computer system, or by an export of a set of host screen data to an external application by the end user computer system.

The method 500 would then start at 506, operating on the applicable set of data entered into the host screen or the set of data to be exported to the external application and proceed in a similar manner described above.

Figure 6:
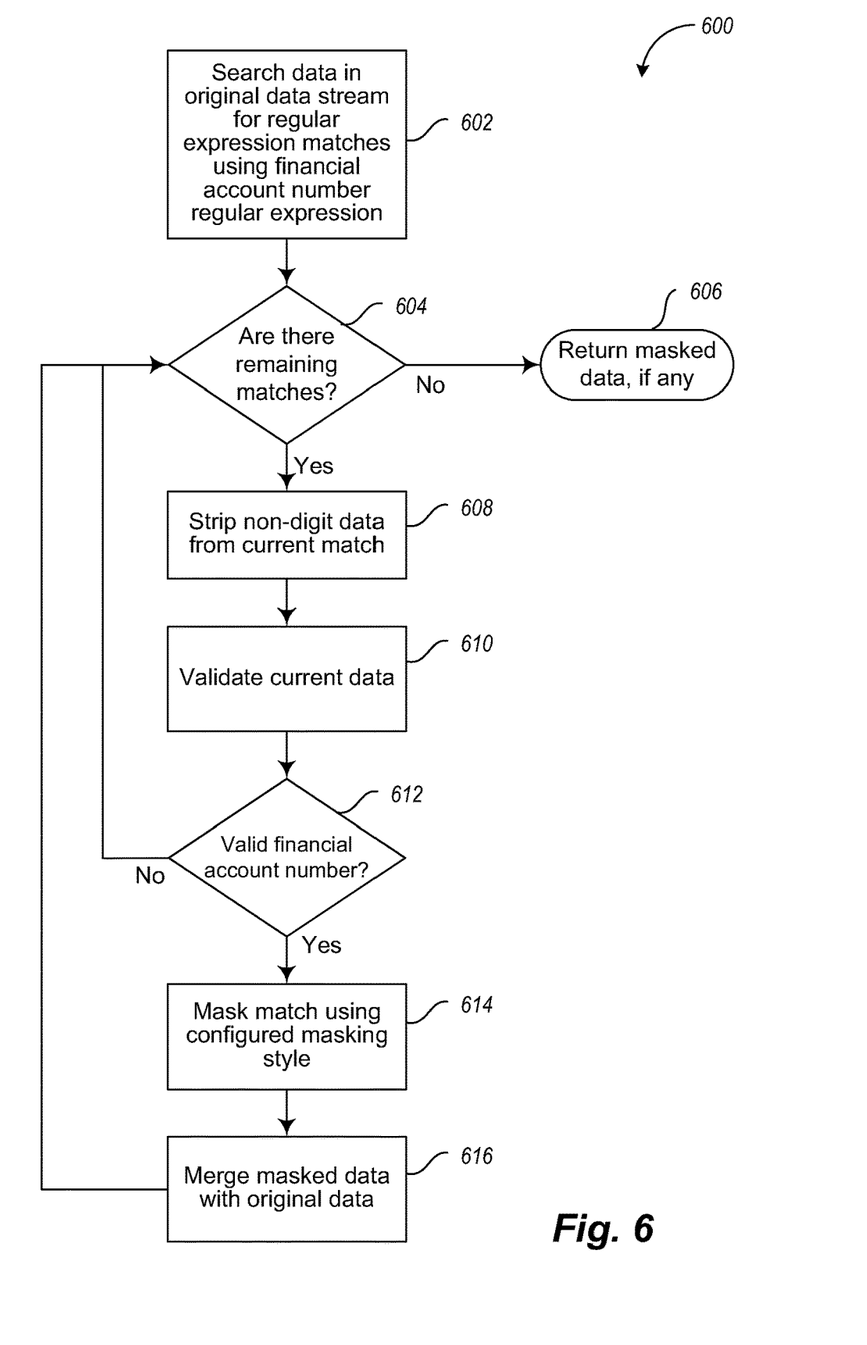
FIG. 6 is a flow diagram showing a method of automatic detection and masking of financial account numbers, according to one illustrated embodiment.

One recognition algorithm embodiment looks for contiguous sets of digits and group separators such as whitespace and dashes to find a match, and then strips out the non-numeric data from the current match. An example of such a method 600 is shown in FIG. 6.

At 602, the system or processor thereof searches data in an original data stream for regular expression matches using a regular expression corresponding to a financial account number (e.g., a credit card number).

At 604, the system or processor thereof determines whether there are any matches found within original data stream yet to be validated, starting with the first match found, if any, as the current match.

At 608, if it was determined that there are matches yet to be validated, starting with the first match found, if any, as the current match, the system or processor thereof strips the non-numerical or non-digit data from the current match.

At 610, the system or processor thereof validates the current match as described above.

At 612, the system or processor thereof determines whether the current match is a valid financial account number (e.g., a valid credit card number) based on the result of the validation. If it was determined that the current match is not a valid financial account number, the current match is not masked and then the method 600 continues to 604 and thus repeats until there are no remaining matches found within the original data stream yet to be validated.

At 614, if it was determined that the current match is a valid financial account number, the system or processor thereof uses a specified masking or redaction algorithm to mask some or all of the digits of the valid financial account number of the current match. The computer-implemented redaction could result in masking the first few, the last few, the first few and last few, digits surrounding, or all digits in the financial account number. Also, the particular masking or redaction algorithm may be provided as a selectable option to a system administrator, end user, or other user.

At 616, the system or processor thereof merges the masked data with the original stream of data. Also, the system or processor thereof may store some or all of the masked data in an alternate display buffer separate from the original data stream. The method 600 then continues on to 604 and thus repeats on until there are no remaining matches yet to be validated.

At 606, the system or processor thereof may return the masked data, if any, for further processing such as for display or export.

Figure 7:
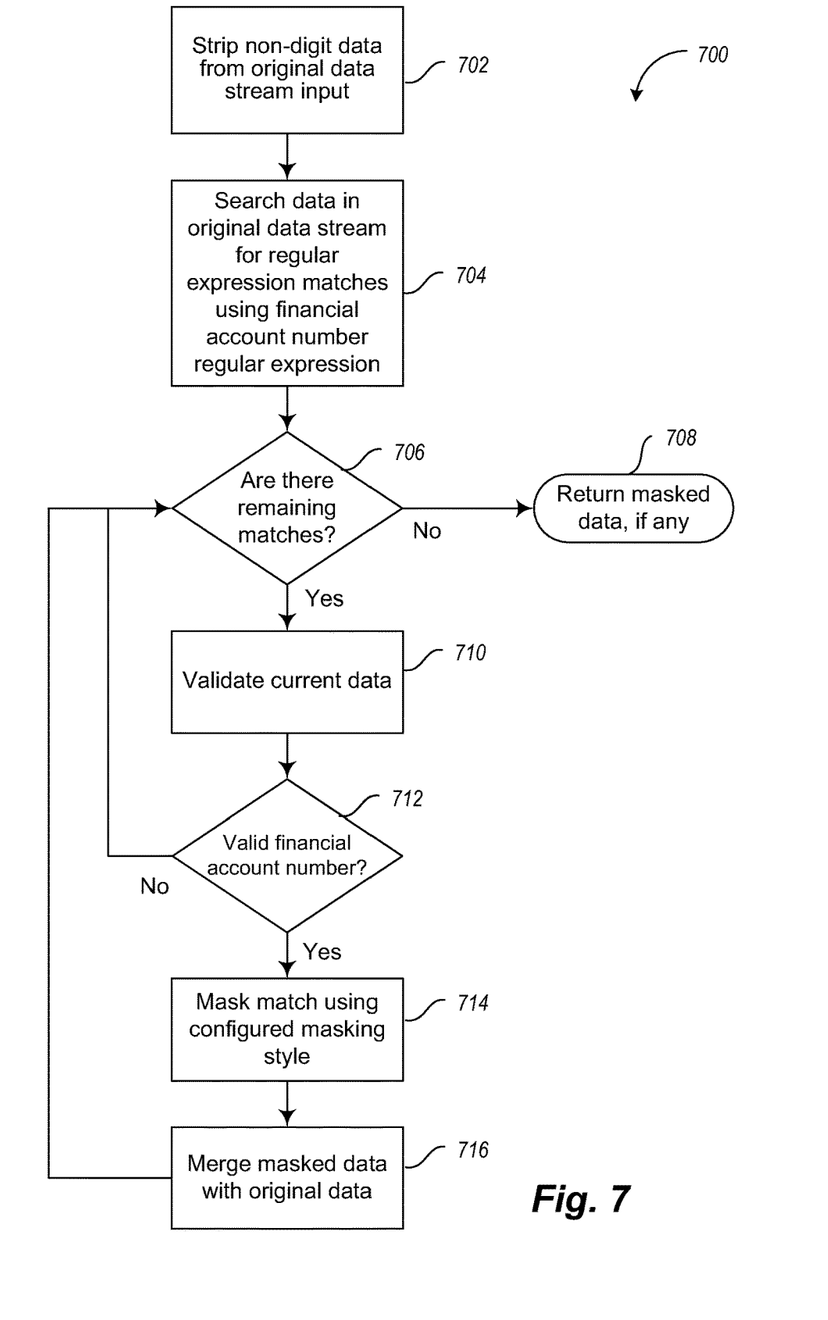
FIG. 7 is a flow diagram showing a method of automatic detection and masking of financial account numbers, according to another illustrated embodiment.

Another embodiment first strips out all non-numeric data from the original input, and then searches the remaining data for groups of digits in patterns that match those associated with financial account numbers (e.g., those patterns used by major credit card issuers). An example of such a method 700 is shown in FIG. 7.

At 702, the system or processor thereof may strip the non-numerical or non-digit data from the original data stream input.

At 704, the system or processor thereof may search the data having had the non-numerical or non-digit data removed or stripped for regular expression matches using a regular expression corresponding to a financial account number (e.g., a credit card number).

At 706, the system or processor thereof may determine whether there are any matches found within the data having had the non-numerical or non-digit data removed that are yet to be validated, starting with the first match found, if any, as the current match.

At 710, the system or processor thereof may validate the current match as described above.

At 712, the system or processor thereof may determine whether the current match is a valid financial account number (e.g., a valid credit card number) based on the result of the validation. If it was determined that the current match is not a valid financial account number, the current match is not masked and then the method 700 continues to 706 and thus repeats until there are no remaining matches found within the original data stream yet to be validated.

At 714, if it was determined that the current match is a valid financial account number, the system or processor thereof uses a specified masking or redaction algorithm to mask some or all of the digits of the valid financial account number of the current match. The computer-implemented redaction could result in masking the first few, the last few, the first few and last few, digits surrounding, or all digits in the financial account number. Also, the particular masking or redaction algorithm may be provided as a selectable option to a system administrator, end user, or other user.

At 716, the system or processor thereof may merge the masked data with the original stream of data. Also, the system or processor thereof may store some or all of the masked data in an alternate display buffer separate from the original data stream. The method 700 then continues on to 706 and thus repeats on until there are no remaining matches yet to be validated.

At 708, the system or processor thereof may return the masked data, if any, for further processing such as for display or export.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary automatic detection and masking systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as floppy disks, hard disk drives, CD ROMs, digital tape, and computer memory; and other non-transitory computer-readable storage media.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method, comprising:
    determining, by at least one processor and for each of a plurality of sets of text data, and based on receiving an event signal indicative of an occurrence of at least one of a number of defined events associated with the set of text data, whether the set of text data that gave rise to the occurrence of the event to which the event signal corresponds includes a subset of text data that matches at least one of a number of user-defined patterns and storing, by the at least one processor, the subset of text data in a protected buffer in memory and retaining remaining portions of the set of text data in an unprotected buffer;
    causing, by the at least one processor and for at least one of the plurality of sets of text data that is determined to have at least one subset of text data that matches at least one of the number of defined user-patterns, at least a portion of the at least one subset of text data that matches the at least one of the number of user-defined patterns to be masked with masked data by replacing the subset of text data in the unprotected buffer with different data as the masked data from the subset of text data with remaining portions of the set of text data that are not associated with the subset of text data remaining in the unprotected buffer as unmasked data after the at least one subset of text data was removed from the unprotected buffer; and
    preventing, by the at least one processor, any exporting and permanent storing of the subset of text data from the protected buffer and detecting data entry events associated with typing, cutting, pasting the subset of text data from the protected buffer and processing the causing in response to the data entry events.

2. The computer-implemented method of claim 1 wherein the number of defined events includes at least a transmission of the set of text data between a host computer system and a terminal emulator executing on an end user computer system, an entry of the set of text data into a host screen displayed by the end user computer system, and an export of a set of host screen data to an external application by the end user computer system.

3. The computer-implemented method of claim 1, further comprising:

based on determining that the subset of text data matches at least one of the number of user-defined patterns, validating the subset of text data by the at least one processor, wherein the at least one processor performs the causing at least a portion of the at least one subset of text data that matches the at least one of the number of user-defined patterns.

4. The computer-implemented method of claim 3, further comprising:
alternatively producing an alert by the at least one processor for any subset of sensitive text data that is not validated.

5. The computer-implemented method of claim 3 wherein validating comprises determining whether the subset of text data represents a valid account identifier of a financial account.

6. The computer-implemented method of claim 3 wherein determining whether the subset of text data represents a valid account identifier of a financial account includes executing a user configurable algorithm on the subset of text data.

7. The computer-implemented method of claim 1 wherein the number of user-defined patterns includes a single user-pattern, the single user-pattern consisting of a number of digits representing an account identifier of a financial account.

8. The computer-implemented method of claim 1 wherein the number of user-defined patterns includes a first user-pattern of contiguous digits and a second user-pattern of digits and separator characters which separate some of the digits.

9. The computer-implemented method of claim 1 wherein the number of user-defined patterns includes a user-pattern of digits formed from a number of digits in each of at least two different fields of a data record.

10. The computer-implemented method of claim 1 wherein the number of user-defined patterns includes at least one user defined pattern of digits defined after distribution by a producer of a set of software executable by the at least one processor to perform the computer-implemented method.

11. The computer-implemented method of claim 1, further comprising:
removing any separator characters of a defined set of extraneous separator characters from the set of text data by the at least one processor before determining whether the set of text data that gave rise to the occurrence of the event to which the event signal corresponds includes the subset of text data that matches at least one of the number of user-defined patterns.

12. The computer-implemented method of claim 1 wherein causing at least a portion of the at least one subset of text data that matches the at least one of the number of user-defined patterns to be masked includes causing at least a first portion of the subset of text data to be masked while causing at least a second portion of the subset of text data to be unmasked.

13. The computer-implemented method of claim 12 wherein the causing at least a first portion of the subset of text data to be masked while causing at least a second portion of the subset of text data to be unmasked is based on a user configurable masking format.

14. The computer-implemented method of claim 1, further comprising:
logging an identifier of a user identifier and an identifier of the subset of text data by the at least one processor for any occurrence of access to the subset of text data by a user identified by the user identifier.

15. The computer-implemented method of claim 1, further comprising:
preventing any export of the subset of text data to any other software application by the at least one processor for any subset of text data that matches the at least one of the number of user-defined patterns.

16. The computer-implemented method of claim 1 wherein the occurrence of the at least one of the number of defined events is an end user indicating the set of text data is to be entered as input.

17. A system comprising:
a computer processor; and
a non-transitory memory communicatively coupled to the computer processor having computer-executable instructions stored thereon that when executed by the computer processor cause the computer processor to perform:
for each of a plurality of sets of text data, and based on receiving an event signal indicative of an occurrence of at least one of a number of defined events associated with the set of text data, determining whether the set of text data that gave rise to the occurrence of the event to which the event signal corresponds includes a subset of text data that matches at least one of a number of user-defined patterns and removing the subset of text data from an unprotected buffer in memory that includes the set of text data and storing the subset of text data in a protected buffer within the memory;
for at least one of the plurality of sets of text data that is determined to have at least one subset of text data that matches at least one of the number of defined user-patterns, causing at least a portion of the at least one subset of text data that matches the at least one of the number of user-defined patterns to be masked with masked data by replacing the subset of text data in the unprotected buffer with different text data as the masked data from the subset of text data with remaining portions of the set of text data that are not associated with the subset of text data remaining in the unprotected buffer as unmasked data after the subset of text data was removed from the unprotected buffer; and
preventing any exporting and permanent storing of the subset of text data from the protected buffer and detecting data entry events associated with typing, cutting, pasting the subset of text data from the protected buffer and processing the causing in response to the data entry events.

18. The system of claim 17 wherein the number of defined events includes at least a transmission of the set of data between a host computer system and a terminal emulator executing on an end user computer system, an entry of the set of text data into a host screen displayed by the end user computer system, and an export of a set of host screen data to an external application by the end user computer system.

19. The system of claim 17 wherein the computer-executable instructions, when executed by the computer processor, further cause the computer processor to perform:
based on determining that the subset of text data matches at least one of the number of user-defined patterns, validating the subset of text data by the at least one processor, wherein the causing at least a portion of the at least one subset of text data that matches the at least one of the number of user-defined patterns.

20. The system of claim 19 wherein the computer-executable instructions, when executed by the computer processor, further cause the computer processor to perform:

alternatively producing an alert for any subset of sensitive text data that is not validated.

21. The system claim of 19 wherein the validating comprises determining whether the subset of text data represents a valid account identifier of a financial account.

22. A non-transitory computer-readable medium includes instructions that are executed by at least one computer system to perform:

determining, by the computer system and for each of a plurality of sets of text data, and based on receiving an event signal indicative of an occurrence of at least one of a number of defined events associated with the set of data, whether the set of text data that gave rise to the occurrence of the event to which the event signal corresponds includes a subset of text data that matches at least one of a number of user-defined patterns and removing, by the computer system, the subset of text data from an unprotected buffer in memory having the set of text data and storing, by the computer system, the subset of text data in a protected buffer within the memory;

causing, by the computer system and for at least one of the plurality of sets of text data that is determined to have at least one subset of text data that matches at least one of the number of user-defined patterns, at least a portion of the at least one subset of text data that matches the at least one of the number of user-defined patterns to be masked with masked data by replacing the subset of text data in the unprotected buffer with different text data as the masked data from the subset of text data with remaining portions of the set of text data that are not associated with the subset of text data remaining in the unprotected buffer as unmasked data after the subset of text data was removed from the unprotected buffer;

preventing any exporting and permanent storing of the subset of text data from the protected buffer and detecting data entry events associated with typing, cutting, pasting the subset of text data from the protected buffer and processing the causing in response to the data entry events.

23. The non-transitory computer-readable medium of claim 22 wherein the number of defined events includes at least a transmission of the set of text data between a host computer system and a terminal emulator executing on an end user computer system, an entry of the set of text data into a host screen displayed by the end user computer system, and an export of a set of host screen data to an external application by the end user computer system.

24. The non-transitory computer-readable medium of claim 22 wherein the instructions, when executed by the at least one computer system, further cause at least one computer system to perform:

based on determining that the subset of text data matches at least one of the number of defined user-patterns, validating the subset of text data by the at least one processor, wherein the causing at least a portion of the at least one subset of text data that matches the at least one of the number of defined user-patterns.

25. The non-transitory computer-readable medium of claim 24 wherein the instructions, when executed by the at least one computer system, further cause at least one computer system to perform:

alternatively producing an alert for any subset of sensitive text data that is not validated.

26. The non-transitory computer-readable medium of claim 24 wherein the validating comprises determining whether the subset of text data represents a valid account identifier of a financial account.

\* \* \* \* \*